US008255190B2

(12) United States Patent
Hala et al.

(10) Patent No.: US 8,255,190 B2
(45) Date of Patent: Aug. 28, 2012

(54) AUTOMATICALLY ADDRESSABLE CONFIGURATION SYSTEM FOR RECOGNITION OF A MOTION TRACKING SYSTEM AND METHOD OF USE

(75) Inventors: Keri Hala, Marshalltown, IA (US); Raymond Sidharta, Marshalltown, IA (US); Boone Oshel, Marshalltown, IA (US)

(73) Assignee: Mechdyne Corporation, Marshalltown, IA (US)

( * ) Notice: Subject to any disclaimer, the term of this patent is extended or adjusted under 35 U.S.C. 154(b) by 472 days.

(21) Appl. No.: 12/684,323

(22) Filed: Jan. 8, 2010

(65) Prior Publication Data

US 2011/0172791 A1 Jul. 14, 2011

(51) Int. Cl.
*G06F 17/50* (2006.01)
*G06F 3/033* (2006.01)
*G09G 5/08* (2006.01)
(52) U.S. Cl. ............................ 703/1; 345/158
(58) Field of Classification Search ........................ 703/7
See application file for complete search history.

(56) References Cited

U.S. PATENT DOCUMENTS

| 5,471,434 A * | 11/1995 | Davis et al. ................ 367/124 |
| 2006/0253570 A1 * | 11/2006 | Biswas et al. ................ 709/224 |
| 2010/0100359 A1 * | 4/2010 | Podoloff et al. .............. 702/191 |

FOREIGN PATENT DOCUMENTS

WO WO 03090411 A1 * 10/2003

OTHER PUBLICATIONS

Buczak, "Self-organizing of heterogeneous sensor network by genetic algorithms", 2001, AlliedSignal, Inc.*
Birman, "Scalable, self-organizing technology for sensor networks", 2004, Dept. of Computer Science, Cornell University; Ithaca, New York 14853.*

* cited by examiner

*Primary Examiner* — David Silver
(74) *Attorney, Agent, or Firm* — Brick Gentry PC; Brian J. Laurenzo

(57) ABSTRACT

A system for automatically uploading a constellation module for a motion tracking system is provided comprising a programmable computer system having a first electronically readable storage medium. A motion tracking system is in communication with the programmable computer system, and includes a controller having a second electronically readable storage medium and a plurality of transponders. A configuration module resides on the first electronically readable medium. The configuration module is adapted to communicate with the motion tracking system and includes a first configuration parameter adapted to automatically instruct the second electronically readable storage medium to delete an existing constellation module, a second configuration parameter adapted to automatically acquire a desired replacement constellation module, and a third configuration parameter adapted to automatically transfer the replacement constellation module to the second electronically readable storage medium. A method for using the system is also provided.

16 Claims, 6 Drawing Sheets

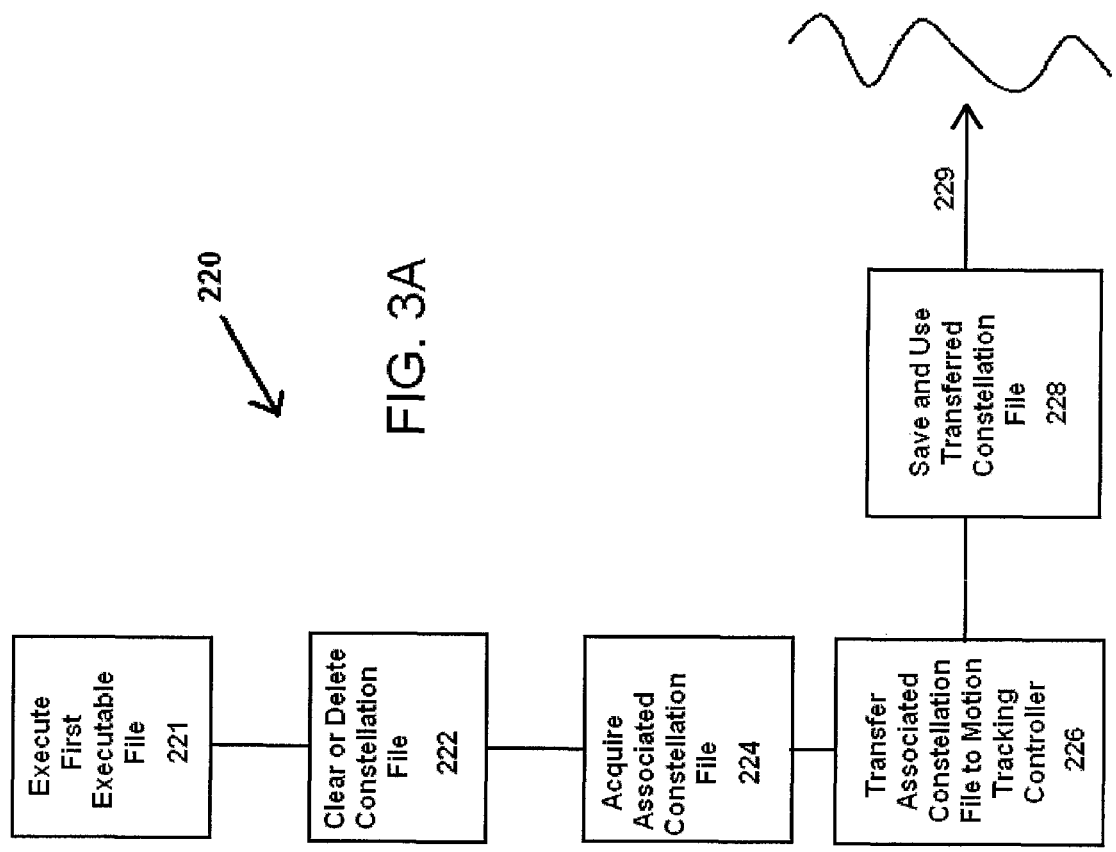

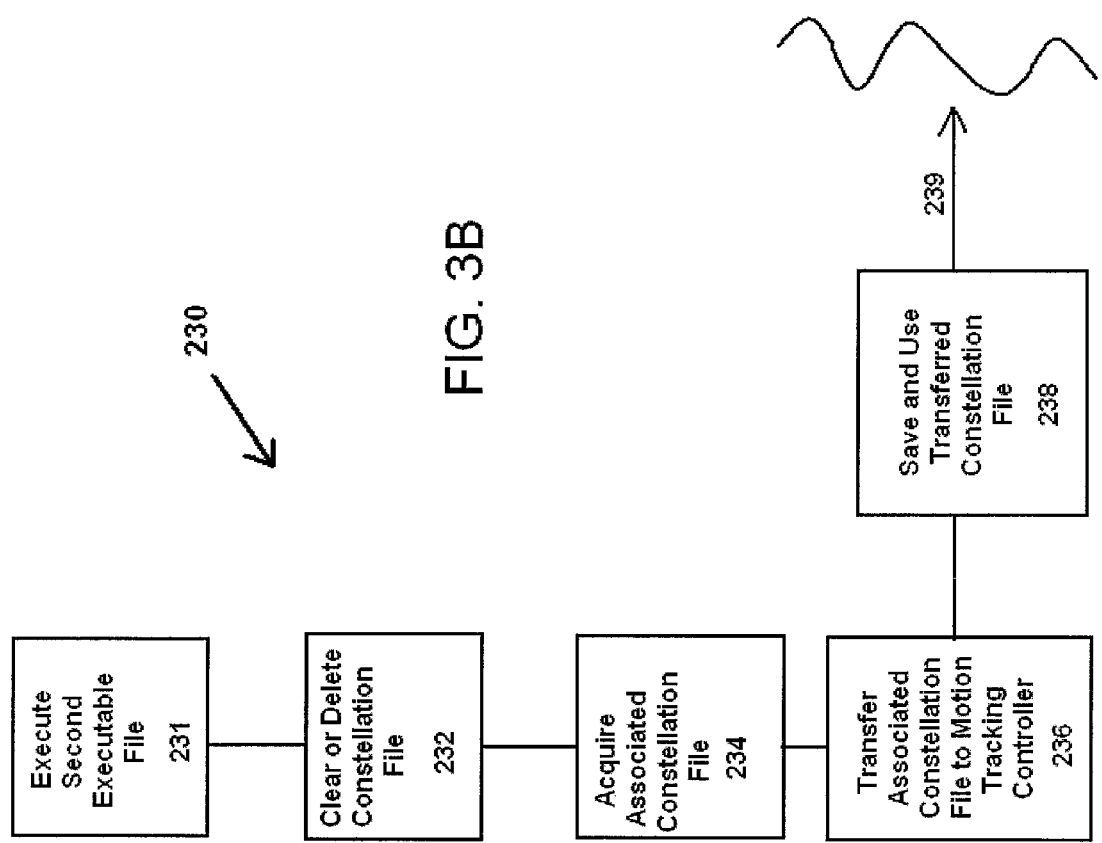

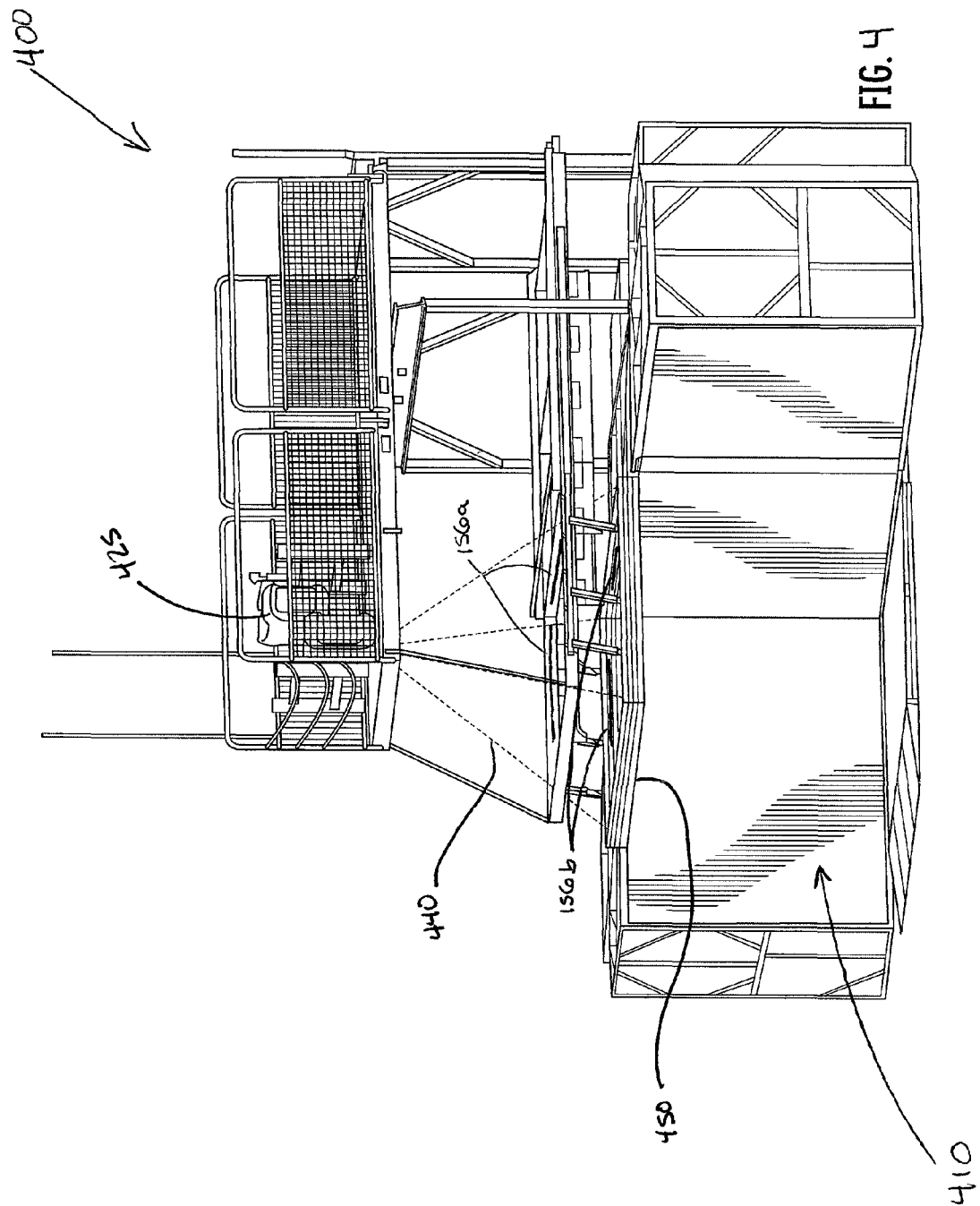

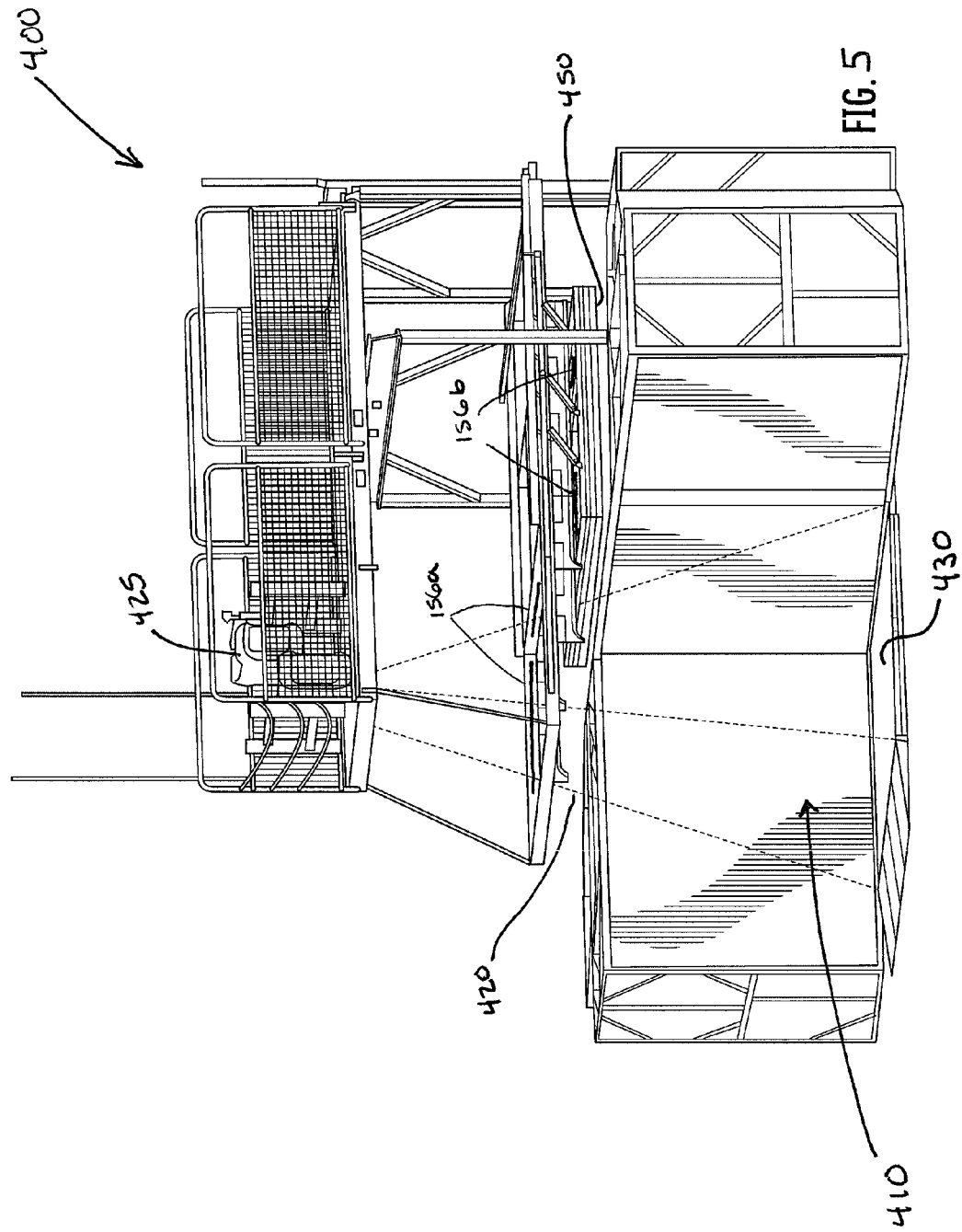

AUTOMATICALLY ADDRESSABLE CONFIGURATION SYSTEM FOR RECOGNITION OF A MOTION TRACKING SYSTEM AND METHOD OF USE

FIELD OF THE INVENTION

The present invention relates to motion tracking systems. More specifically, the present invention relates to a system for automatic and selective recognition of two or more arrangements of motion tracking transponders in a motion tracking system.

BACKGROUND

Systems for detecting and tracking motion provide a user the opportunity to interact with a simulated environment. A simulated environment is wide ranging, and may include, but is not limited to, seismic analysis and well planning for oil or gas fields, virtual automotive design and analysis, fixed wing and rotary flight simulation, weapon training simulation, combat motor vehicle simulation, welding simulation, sports or athletic simulation and research analysis, and medical field training, research analysis, and interactive simulation. The simulated environment may include a single or multiple visual displays. The multiple visual displays may be combined to form an immersive system, including one or more horizontal wall displays, a ceiling and/or a floor display. The displays are combined to project a single, continuous image between the multiple displays. A motion tracking system may be integrated with the visual displays of a simulated environment to track the movements of a user within a defined area of movement or tracking workspace. The defined area of movement or tracking workspace may vary in size, and may include, but is not limited to, a room, an area within a room, or a simulated cockpit.

The motion tracking system includes one or more transponders which are physically integrated or mounted at various locations over or around the desired tracking workspace. Each transponder emits a signal. The arrangement of transponders and associated coordinate measurements are used to create a transponder location map or constellation file which defines the placement and arrangement of the transponders about the tracking workspace.

However, motion tracking systems currently in use have limitations. A microprocessor controller in communication with the transponders can only store and utilize one constellation file. This effectively limits the motion tracking system to utilizing only one arrangement of transponders. In applications having two or more transponder arrangements or constellation files, a user must electronically connect to the microprocessor controller and separately load a different constellation file. This process is cumbersome and time consuming as a series of multiple steps must be physically and manually executed to load the new constellation file. Further, the loading process and associated steps must be repeated for each different constellation. Accordingly, current motion tracking systems are not conducive to applications having more than one transponder arrangement and constellation file. For example, in some currently available motion tracking systems, in order to change constellation files a user must connect to a motion tracking system processor through a manually executable program or application. The user must manually traverse a series of steps to clear the existing constellation file and load a second, different constellation file. Once loaded, the user must exit the application before the constellation may be utilized.

Accordingly, it would be desirable to have a system which allows for the utilization of two or more arrangements of transponders or constellation files in a simple and efficient manner. Further, it would be advantageous to have a system which allows for selective loading of two or more constellation files in a short amount of time. In addition, it would be advantageous to have a system which would automatically configure an arrangement of transponders through the automatic uploading and installation of an associated constellation file.

SUMMARY OF THE INVENTION

A system for automatically uploading a constellation module for a motion tracking system is provided comprising a programmable computer system having a first electronically readable storage medium. A motion tracking system is in communication with the programmable computer system, and includes a controller having a second electronically readable storage medium and a plurality of transponders. A configuration module resides on the first electronically readable medium. The configuration module is adapted to communicate with the motion tracking system and includes a first configuration parameter adapted to automatically instruct the second electronically readable storage medium to delete an existing constellation module, a second configuration parameter adapted to automatically acquire a desired replacement constellation module, and a third configuration parameter adapted to automatically transfer the replacement constellation module to the second electronically readable storage medium.

In another embodiment of an automatically addressable configuration system, the system includes a user interface including a plurality of controls and a system controller in communication with the user interface and adapted to receive commands from the user interface. A programmable computer system is in communication with the system controller, the programmable computer system having a first electronically readable storage medium. A configuration module resides on the first electronically readable storage medium and is adapted to communicate with the system controller. A motion tracking system is in communication with the programmable computer system and configuration application, the motion tracking system includes a controller having a second electronically readable medium and a plurality of transponders, wherein the configuration application is adapted to receive a command from the system controller and accordingly communicate with the motion tracking system to automatically delete an existing constellation module on the second electronically readable medium and automatically transfer a replacement constellation module associated with the system controller communication to be stored on the second electronically readable medium.

A method for selectively uploading a constellation module for a motion tracking system is also provided. In the method, a first predefined configuration parameter in a dynamic code set is automatically executed instructing a motion tracking system controller to delete a first constellation module residing on an electronically readable storage medium associated with the motion tracking system controller. A second predefined configuration parameter in a dynamic code set is automatically executed acquiring a second constellation module. A third predefined configuration parameter in a dynamic code set is automatically executed uploading the second constellation module to the electronically readable storage medium.

BRIEF DESCRIPTION OF THE DRAWINGS

FIG. 3A is a flow diagram of the system of FIG. 1, depicting in greater detail the script activation step 220 of FIG. 2.

FIG. 3B is a flow diagram of the system of FIG. 1, depicting in greater detail the script activation step 230 of FIG. 2.

FIG. 4 is a side elevation view of a multi-display immersive visualization system using the automatically addressable configuration system for a motion tracking system of FIG. 1, having the ceiling display in the closed position.

FIG. 5 is a side elevation view of a multi-display immersive visualization system using the automatically addressable configuration system for a motion tracking system of FIG. 1, having the ceiling display in the open position.

DETAILED DESCRIPTION

Figure 1:
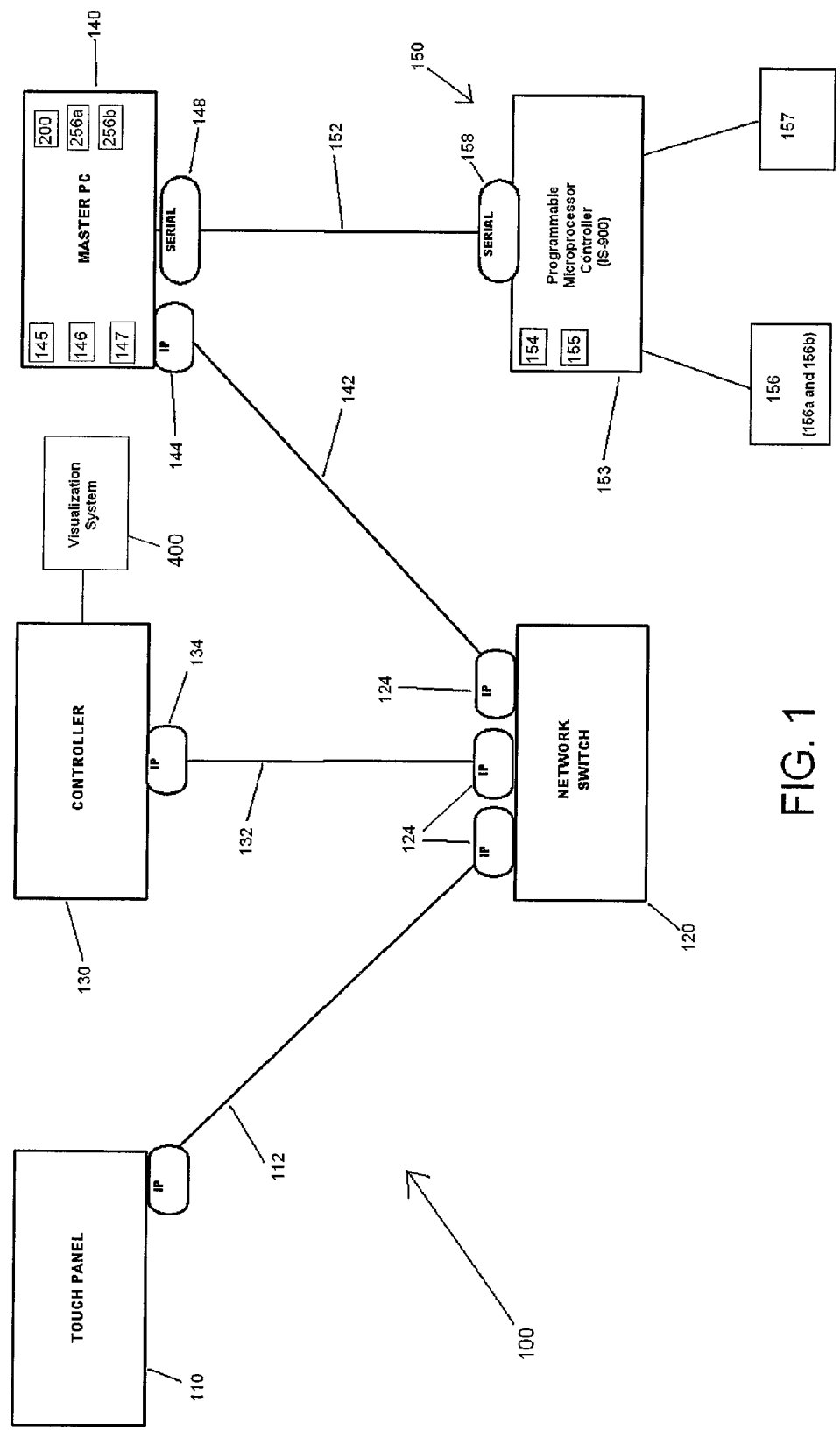
FIG. 1 is a block diagram of an automatically addressable configuration system for a motion tracking system in accordance with one or more examples of embodiments of the present invention.

Motion tracking systems include one or more transponders which are physically integrated or mounted at various locations over or around the desired tracking workspace. Each transponder emits a signal. The transponders may employ different tools or signals to track motion, including, but not limited to, cameras, sound, infrared, inertial, optical, electromagnetic or any other known, or future developed motion tracking tool or methodology. The transponders may be mounted about a tracking workspace as a single, individual transponder, or grouped together to be mounted in a housing. The transponder housing may be shaped as a strip, as a wing, at an angle or as any other desirable shape or arrangement.

Following installation or mounting of the one or more transponders, the transponders require calibration to properly define the dimensions of the desired tracking workspace. Calibration requires precise measurement of the Cartesian X, Y, Z coordinates of each transponder. The coordinate measurements are used to create a transponder location map or constellation file which defines the placement and arrangement of the transponders about the tracking workspace. An accurate constellation file is necessary to properly track movement within the tracking workspace, as the coordinate measurements in the constellation file act as fixed points of comparison for tracking motion.

The signal emitted by each transponder may be received by a tracked device or station or sensor. The sensor may include a variety of structural arrangements and be positioned near the transponder, may be positioned at a second location around the desired tracking workspace, or may be positioned on the user. For example, the sensor may be hand held, may mount to virtual reality interface gloves, may be mounted to the head of a user, may include a wand and stylus, may include a joystick, or may be mounted to any desirable portion of the user's body or in the tracking workspace.

The transponder and/or sensor output positional information within the tracking workspace, for example Cartesian coordinates corresponding to an X, Y, Z position. Further, the transponder and/or sensor may output orientation information within the tracking workspace, for example pitch, yaw, and roll. The transponder and/or sensor communicate with a microprocessor controller to convey the positional and/or orientation information. The microprocessor controller also stores the constellation file. The microprocessor controller receives the positional and/or orientation information, compares the information with the constellation file and transforms the information into spatial or range measurements to compute a position within the tracking workspace. The microprocessor then communicates the computed position and/or range measurements with one or more master processors controlling the simulated environment. The simulated environment processors utilize the computed position and/or range measurements to responsively change or alter the simulated environment.

As an example, the IS-900™ Motion Tracking System employs a transponder which utilizes sound to track movement. Specifically, the IS-900™ transponder transmits ultrasonic pulses. The ultrasonic pulses are received by one or more ultrasonic microphones integrated into the sensor. Using the speed of sound, range measurements are obtained and transmitted to a processor. The IS-900™ processor uses the range measurement data to ascertain the position of a sensor and any associated movement in relation to the transponders. This process includes a comparison of the range measurement data to the constellation file, which is stored on the IS-900™ processor. The IS-900™ processor may then communicate with a separate master processor which controls a simulated environment to responsively change or alter the simulated environment. Additional description of the exemplary system and associated computations is disclosed in U.S. Pat. No. 6,314,055, issued on Nov. 6, 2001, and entitled Range Measuring System.

Integration of a motion tracking system with a simulated environment or visualization system has numerous practical advantages. For example, a motion tracking system with a simulated environment enhances a user's experience by minimizing or eliminating external controls which are unrelated to the simulated environment. Further, motion tracking systems enable a user to physically interact with the simulated environment, enhancing awareness retention by engaging the entire brain of a user through physical and sensory immersion. In addition, motion tracking systems increase the realism of the simulated environment.

The following presents one or more examples of embodiments of an automatically addressable configuration system 100 for a motion tracking system 150. For ease of discussion and understanding, the following detailed description and illustrations refer to an acoustic or sound based motion tracking system 150, specifically an IS-900™ Motion Tracking System, available from INTERSENSE, INC. (located in Bedford, Mass.). It should be appreciated that the illustrated motion tracking system 150 is provided for purposes of illustration, and the automatically addressable configuration system 100 may be used with any type, style or arrangement of motion tracking system which has one or more transponders positioned about a tracking area or tracking workspace and which are calibrated to include at least one transponder location map or constellation. In addition, for ease of discussion and understanding, the following detailed description and illustrations refer to a motion tracking system 150 operating in association with a multi-display immersive visualization system 400. It should be appreciated that the illustrated multi-display immersive visualization system 400 is provided for purposes of illustration, and the automatically addressable configuration system 100 and associated motion tracking system 150 may be used with any type, style, arrangement or device suitable for use with a motion tracking system 150.

FIG. 1 illustrates an automatically addressable configuration system 100 in accordance with one or more examples of embodiments of the present invention. The visualization system 100 may include a user touch panel or regulator or user interface 110 in communication with a visualization system controller 130 through a network switch or router 120. A master computer system or master programmable computer (PC) 140 may be in communication with the visualization system controller 130 and/or user interface 110, also through router 120. Further, the master computer system 140 may be in communication with a motion tracking system 150.

The user touch panel or regulator or user interface 110 includes a push button or toggle switch or dial or lever or input control 111. The user interface 110 may be a touch panel or touch screen control, for example an AMX™ Touch Panel available from AMX, LLC (located in Richardson, Tex.). In one or more examples of embodiments, the user interface 110 may be any brand or type of touch screen control, a graphical user interface (GUI) controller, a control panel or any other type of control assembly enabling a user to selectively input a command and/or transmit a control signal.

The user interface 110 may be in communication with the visualization system controller 130 through a router 120. The user interface 110 may be in communication with the router 120 by a communication link 112 adapted to transmit a signal. The communication link 112 may be a Category 5 or Cat5 cable. In one or more examples of embodiments, communication link 112 may be any suitable communications protocol and associated transmission device to transmit commands from user interface 110, including, but not limited to, wireless communication, transmission control protocol/internet protocol (TCP/IP), ethernet, or universal serial bus (USB). Further, in one or more examples of embodiments, the user interface 110 may be in direct communication with the master computer system 140.

The router or network switch or network assembly or hub 120 includes a plurality of network ports 124. At least one network port 124 receives communication link 112. The router 120 creates a common address or communication scheme to allow the connected electronic devices to communicate with each other over a local area network (LAN). The router 120 may be or include any suitable known or future developed network communication device. In one or more examples of embodiments, the router 120 may be in wireless communication with the user interface 110, visualization system controller 130 and/or master computer system 140.

As shown in FIG. 1, the visualization system controller 130 is in communication with router 120 via a second communication link 132. Communication link 132 may be identical to communication link 112. Communication link 132 may be connected to a network port 124 on router 120 and a corresponding network port 134 on the visualization system controller 130. In one or more examples of embodiments, communication link 132 may be any transmission device to receive and/or transmit commands. Further, in one or more examples of embodiments, the visualization system controller 130 may be in direct communication with the master computer system 140.

The visualization system controller 130 is a centralized controller or programmable computer programmed to control and automate any associated devices. As illustrated in FIG. 1, the visualization system controller 130 is in communication with a visualization system 400. Accordingly, the visualization system controller 130 includes programming to control and automate portions of the visualization system 400. The visualization system controller 130 may include any suitable programmable controller for control and automation of any associated devices. For example, the visualization system controller 130 may be an AMX™ NI-2100 Integrated Controller. The NI-2100 controller utilizes NETLINX™ programming language, which includes an interface enabling utilization of JAVA™ based programming modules.

Referring to FIG. 1, the master computer system or master personal computer (PC) 140 is in communication with router 120 by a third communication link 142. Communication link 142 may be identical to communication links 112, 132. Communication link 142 may be connected to a network port 124 on router 120 and a corresponding network port 144 on the master computer system 140. In one or more examples of embodiments, communication link 132 may be any transmission device to receive and/or transmit commands.

Master computer system 140 is a programmable computer system including random access memory (RAM) 145, a computer readable storage medium or storage device or hard drive 146 and a processor 147. The master computer system 140 stores or carries an automatically addressable configuration application 200. Further, a user may employ the master computer system 140 to operate the automatically addressable configuration application 200. In one or more examples of embodiments, the master computer system 140 may be any known or future developed programmable computer processor system suitable to store data and operate the automatically addressable configuration application 200. Further, in one or more examples of embodiments, the computer readable storage medium 146 may include any data storage device which can store data that can be thereafter read by a computer system. Examples of computer readable medium 146 may include read-only memory, CD-ROM, CD-R, CD-RW, DVD, DVD-RW, magnetic tapes, Universal Serial Bus (USB) flash drive, or any other optical or other suitable data storage device. The computer readable medium 146 may also be distributed over a network coupled or in communication with master computer system 140 so that the computer readable code or application, including the automatically addressable configuration application 200, is stored and executed in a distributed fashion.

The motion tracking system 150 is in communication with the master computer system 140 by a fourth communication link 152. As illustrated in FIG. 1, the communication link 152 is a serial cable connected to a first serial port interface or network port 148 associated with the master computer system 140 and a second serial port interface or network port 158 associated with the motion tracking system 150. In one or more examples of embodiments, communication link 152 may be identical to communication links 112, 132, 142, or may be any suitable transmission control protocol/internet protocol (TCP/IP), ethernet, universal serial bus (USB), or suitable communications protocol and associated transmission device to transmit commands between the master computer system 140 and motion tracking system 150. Further, in one or more examples of embodiments, the motion tracking system 150 may be in wireless communication with the master computer system 140, through a wireless device or assembly (not shown).

The motion tracking system 150 may include a programmable microprocessor controller 153. The programmable microprocessor controller 153 may carry or house the second serial port interface or network port 158. The programmable microprocessor controller 153 includes a computer readable storage medium or storage device or hard drive 154 and a processor 155. In one or more examples of embodiments, the computer readable medium 154 may include any data storage device which can store data that can be thereafter read by a computer system, in particular the programmable microprocessor controller 153. Examples of computer readable storage medium 154 may include read-only memory, CD-ROM, CD-R, CD-RW, DVD, DVD-RW, magnetic tapes, Universal Serial Bus (USB) flash drive, or any other optical or other suitable data storage device.

The motion tracking system 150 may include one or more transponders 156. As shown in FIG. 1, the one or more transponders 156 is in communication with the programmable microprocessor controller 153. The transponders 156 emit a signal to track motion within a designated or defined area or a tracking workspace. To this end, the transponders 156 may employ different tools or signals to track motion, including, but not limited to, cameras, sound, infrared, inertial, optical, electromagnetic or any other known, or future developed motion tracking tool or methodology.

The transponders 156 may be mounted about a tracking workspace or defined area of movement 410. As illustrated in FIGS. 4 and 5, a plurality of transponders 156a and 156b, are installed on a multi-display immersive visualization system 400 above or about the tracking workspace 410. In one or more examples of embodiments, a single, individual transponder 156 or a plurality of transponders 156 grouped in a housing may be attached or mounted about the tracking workspace 410. To this end, the transponder housing may be shaped as a strip, as a wing, at an angle or as any other desirable shape.

The transponders 156 are calibrated to properly define the dimensions of the tracking workspace 410. Calibration involves measurement of the Cartesian X, Y, Z coordinates of each respective or group of transponders 156 about the tracking workspace 410. The coordinate measurements are used to create a transponder location map or constellation file or constellation module 256. Each constellation file or module 256 defines the placement and arrangement of specified transponders 156 about the tracking workspace 410. As illustrated in FIG. 1, two constellation files or modules 256a, 256b may reside or be stored or carried by the master computer system 140 on the computer readable medium 146. Constellation file or module 256a corresponds with the arrangement or placement of transponders 156a, shown in FIGS. 4 and 5. Constellation file or module 256b corresponds with the arrangement or placement of transponders 156b, also shown in FIGS. 4 and 5. In one or more examples of embodiments, any number of constellation files or modules 256 may exist or be stored on the master computer system 140.

The motion tracking system 150 may include one or more sensors 157. Referring to FIG. 1, the sensor 157 is in communication with the programmable microprocessor controller 153. The sensor 157 receives the signal emitted by transponders 156 to assist with tracking motion within the designated or defined area or tracking workspace 410. The sensor 157 may include a variety of structural arrangements and associated positions. To this end, the sensor 157 may be positioned near the transponder 156, may be positioned at a second location away from transponder 156 around the desired tracking workspace 410, or may be positioned on a user. For example, the sensor 157 may be hand held, may mount to virtual reality interface gloves, may be mounted to the head of a user, may include a wand and stylus, may include a joystick, or may be mounted to any desirable portion of the user's body or in the tracking workspace 410.

The foregoing presents an example of an embodiment of an automatically addressable configuration system 100. The system 100 also includes the automatically addressable configuration application or configuration module or dynamic code set 200. As shown in FIG. 1, the automatically addressable configuration application or module or dynamic code set 200 is a machine-readable medium carried or stored or operated in association with the master computer system 140 or computer readable storage medium 146. The automatically addressable configuration application 200 is prepared or written in JAVA™ based programming language. However, in one or more examples of embodiments, the automatically addressable configuration application 200 may be prepared or written in any suitable programming language.

Figure 2:
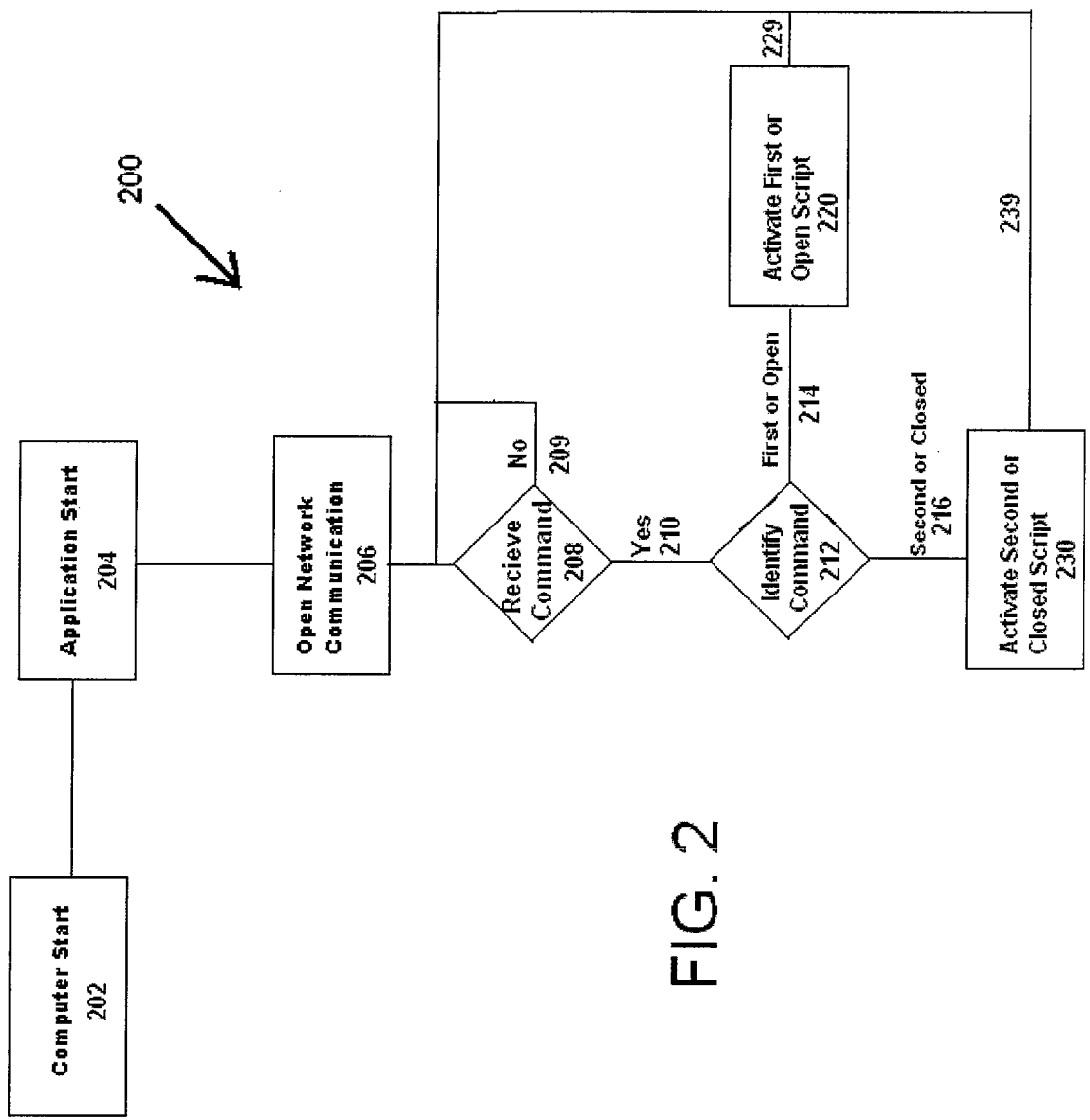
FIG. 2 is a logic diagram of the automatically addressable configuration application for use with the system of FIG. 1.

As illustrated in FIGS. 2, 3A and 3B, the automatically addressable configuration application or module or dynamic code set 200 includes configuration parameters or a script or program which functions to control or facilitate automatically a series of steps to selectively install and configure a motion tracking system 150.

The automatically addressable configuration system 100 and automatically addressable configuration application 200 enable the automatic loading and configuration of a specified arrangement of transponders 156 and corresponding constellation file 256 associated with a motion tracking system 150. The illustrated system 100 is operationally associated with a multi-display immersive visualization system 400. As illustrated in FIGS. 4 and 5, the multi-display immersive visualization system 400 includes two sets of transponders 156a and 156b. Referring to FIG. 5, transponders 156a are associated for tracking motion or use with the visualization system 400 when an image 420, shown in broken lines, is projected from an overhead projector 425 to a floor screen 430 of the visualization system 400. Referring to FIG. 4, transponders 156b are associated for tracking motion or use with the visualization system 400 when an image 440, shown in broken lines, is projected from overhead projector 425 to a ceiling screen 450 of the visualization system 400. In one or more examples of embodiments, the multi-display immersive visualization system 400 may have any number or sets of transponders 156.

Referring to FIG. 2, the automatically addressable configuration application 200 includes a series of processing instructions or steps, which is depicted in flow chart or flow diagram form. The master computer system 140 is powered on or started at step 202. The master computer system 140 may be powered on directly by a user or automatically in association with the automatically addressable configuration system 100. Next, the application 200 is started or initiated or executed at step 204. The application 200 may start manually, for example by manual activation of an executable file by a user or operator, or may start automatically, for example by automatic execution during the master computer system 140 start-up sequence. Once the application 200 starts, it opens or initiates communication with the local area network at step 206. Communication with the local area network may be opened through communication link 142 to router 120, as illustrated in FIG. 1.

Referring to FIG. 2, once the application 200 starts and the network connection is initiated, the application automatically acts as a listener program. Accordingly, the application 200 listens and awaits a command from a device associated with the local area network, for example the user interface 110 or visualization system controller 130. In one or more examples of embodiments, the application 200 may listen for a command from a device hosting application 200.

At step 208, the automatically addressable configuration application 200 and associated configuration parameters operates automatically without user input as the process is managed by code. At step 208, the application 200 automatically actively listens to ascertain whether it has received a recognizable command. If no command is received, the application 200 automatically returns to or maintains active listening at step 209. The application 200 automatically continues the sequence of listening for a command 208, and if no command is received, returning to listening for a command 209, until a recognizable command is received. At step 210, the application 200 has automatically received a recognizable command from a device associated with the local area network. Once the recognizable command has been received, the application 200 automatically identifies what the command is at step 212. Identification step 212 involves automatically ascertaining the appropriate command in order to execute associated command scripts. Once the application 200 identifies the recognizable command, the application automatically moves to respond to a first recognizable command or first command at step 214 or moves to respond to a second recognizable command or second command at step 216. The step chosen by the application 200 depends upon the recognized command received. In one or more examples of embodiments, application 200 may automatically recognize any number of commands and include associated steps to automatically respond to said commands.

At step 214, the application 200 automatically recognizes a first command, for which the application 200 automatically activates an associated first script or executable file at step 220. The activation or execution of the first script or executable file is set out in greater detail in FIG. 3A. The application 200 automatically executes an associated first script or first executable file at step 221. Upon automatic execution of the first executable file, the application 200 communicates or issues a command at step 222 to the programmable microprocessor controller 153 to clear or delete the currently existing constellation file 256 associated with the controller 153. The constellation file 256 stored on hard drive 154 is subsequently deleted or cleared. At step 224, the application 200 next automatically acquires a constellation file 256 associated with the first command, here constellation file 256a. Next, at step 226, the application 200 automatically communicates or issues a command to the programmable microprocessor controller 153, transferring a second or replacement or associated constellation file 256a to the controller 153. At step 228, the application 200 automatically directs the controller 153 to save or store or use the uploaded constellation file 256a. Accordingly, the controller 153 now stores and uses the uploaded constellation file 256a to track motion or movement in accordance with the motion tracking system 150 described above. At step 229, the first executable file automatically closes, and returns the automatically addressable configuration application 200 to step 208 in order to listen for another command, as shown in FIG. 2. Accordingly, through execution of the first script or executable file, the automatically addressable configuration application 200 selectively loads a desired constellation file 256a associated with a command, providing automatic loading and configuration of a selected transponder arrangement or constellation file. Further the loading of constellation file 256a occurs quickly without the need of additional, outside steps by a user.

Referring to FIG. 2, at step 216, the application 200 recognizes a second command, for which the application 200 automatically activates an associated second script or executable file at step 230. The activation of the second script or executable file is set out in greater detail in FIG. 3B. The application 200 automatically executes associated second script or second executable file at step 231. Upon automatic execution of the second executable file, the application 200 automatically communicates or issues a command at step 232 to the programmable microprocessor controller 153 to clear or delete the currently existing constellation file 256 associated with the controller 153. The constellation file 256 stored on hard drive 154 is subsequently deleted or cleared. At step 234, the application 200 next automatically acquires a constellation file 256 associated with the second command, here constellation file 256b. Next, at step 236, the application 200 automatically communicates or issues a command to the programmable microprocessor controller 153 transferring the second or replacement or associated constellation file 256b to the controller 153. At step 238, the application 200 automatically directs the controller 153 to save or store or use the uploaded constellation file 256b. Accordingly, the controller 153 now stores and uses the uploaded constellation file 256b to track motion or movement in accordance with the motion tracking system 150 described above. At step 239, the first executable file automatically closes, and returns the automatically addressable configuration application 200 to step 208 in order to listen for another command, as shown in FIG. 2. Accordingly, through execution of the second script or executable file, the automatically addressable configuration application 200 selectively loads a desired constellation file 256b associated with a command, providing automatic loading and configuration of a selected transponder arrangement or constellation file. Further the loading of constellation file 256ba occurs quickly without the need of additional, outside steps by a user.

Accordingly, the foregoing presents a machine-readable medium including instructions, which, when executed by a machine, cause the machine to perform operations. The instructions in one or more examples of embodiments are configuration parameters managed by a computer and which are arranged to acquire, transfer and install instructions on an additional machine or computer or computer readable storage medium.

In operation and use, the automatically addressable configuration system 100 and all associated components are initially powered on. Once power is supplied, a user may initiate the automatically addressable configuration application 200.

Once all components and applications are operational, a user may input a command into user interface 110, for example, actuating a control directing or commanding the visualization system 400 to open the ceiling screen 450 and project an image 430 to the floor screen 430. The user interface 110 will communicate the command through a first communication link 112 to router 120. In turn, router 120 will communicate or transfer or route the command to the visualization system controller 130 through the second communication link 132. The visualization system controller 130 receives the "open" command and directs the visualization system 400 to open the ceiling screen 450. The opening or retracting of the ceiling screen 450 is best illustrated by comparing the position of ceiling screen 450 in FIG. 4 to its position in FIG. 5. In FIG. 5, the ceiling screen 450 is fully retracted and the visualization system 400 is in the "open" configuration.

Simultaneously, the automatically addressable configuration application 200 receives the recognizable "open" command across the third communication link 142 (at step 208 of FIG. 2). The application 200 automatically recognizes the command as "open" or a first command (at step 214 of FIG. 2) and activates or executes the associated first script or executable file (at steps 220, 221 of FIGS. 2 and 3A). Referring to FIGS. 1 and 3A, the application 200 subsequently automatically communicates with the programmable microprocessor controller 153 of motion tracking system 150 through the fourth communication link 152. The application 200 automatically instructs the controller 153 to delete or clear the existing constellation file 256 on hard drive 154 (at step 222 of FIG. 3A). The application 200 then automatically acquires the constellation file 256a associated with the arrangement of transponders 156a used for tracking motion when the visualization system 400 is in the "open" configuration (at step 224 of FIG. 3A). The application 200 automatically transfers constellation file 256a to controller 153, which is accordingly saved on hard drive 154 (at steps 226 and 228 of FIG. 3A). The application 200 also automatically instructs controller 153 to use constellation file 256*a*, and the associated transponders 156*a*, to track motion (step 228 of FIG. 3A). The application 200 then automatically returns to the listening step to await another recognizable command (steps 229 and 208 of FIG. 2). The motion tracking system 150 now tracks motion using transponders 156*a* and the associated constellation 256*a*. The loading of the constellation 256*a* associated with the "open" configuration of visualization system 400 occurred quickly and automatically following the input of a command into user interface 110. In one or more examples of embodiments, the automatically addressable configuration application 200 may receive or interpret a command from the user interface 110 or the visualization system controller 130.

To convert or transform the visualization system 400 into the "closed" configuration, a user may input a command into user interface 110, for example, actuating a control directing or commanding the visualization system 400 to close the ceiling screen 450 and project an image 440 to the ceiling screen 450. The user interface 110 communicates the command through a first communication link 112 to router 120. In turn, router 120 communicates or transfers or routes the command to the visualization system controller 130 through the second communication link 132. The visualization system controller 130 receives the "closed" command and directs the visualization system 400 to close the ceiling screen 450. The closing or extension of the ceiling screen 450 is best illustrated by comparing the position of ceiling screen 450 in FIG. 5 to its position in FIG. 4. In FIG. 4, the ceiling screen 450 is fully extended and the visualization system 400 is in the "closed" configuration.

Simultaneously, the automatically addressable configuration application 200 receives the recognizable "closed" command across the third communication link 142 (at step 208 of FIG. 2). The application 200 recognizes the command as "closed" or a second command (at step 216 of FIG. 2) and automatically activates or executes the associated second script or executable file (at steps 230, 231 of FIGS. 2 and 3B). Referring to FIGS. 1 and 3B, the application 200 subsequently automatically communicates with the programmable microprocessor controller 153 of motion tracking system 150 through the fourth communication link 152. The application 200 instructs the controller 153 to delete or clear the existing constellation file 256 on hard drive 154 (at step 232 of FIG. 3B). The application 200 then automatically acquires the constellation file 256*b* associated with the arrangement of transponders 156*b* used for tracking motion when the visualization system 400 is in the "closed" configuration (at step 234 of FIG. 3B). The application 200 automatically transfers constellation file 256*b* to controller 153, which is accordingly saved on hard drive 154 (at steps 234 and 238 of FIG. 3B). The application 200 also automatically instructs controller 153 to use constellation file 256*b*, and the associated transponders 156*b*, to track motion (step 238 of FIG. 3B). The application 200 then automatically returns to the listening step to await another recognizable command (steps 239 and 208 of FIG. 2). The motion tracking system 150 now tracks motion using transponders 156*b* and the associated constellation 256*b*. The loading of the constellation 256*b* associated with the "closed" configuration of visualization system 400 occurs quickly and automatically following the input of a command into user interface 110. In one or more examples of embodiments, the automatically addressable configuration application 200 may receive or interpret a command from the user interface 110 or the visualization system controller 130.

The foregoing embodiments provide advantages over currently available devices and systems. The automatically addressable configuration system and associated automatically addressable configuration application described herein provides a user of a motion tracking system the ability to utilize two or more arrangements of transponders or constellation files in a simple and efficient manner. The system and application enables a user to automatically load or upload and install a constellation file with a single command. This not only reduces the time required to load a constellation file, but eliminates the need for an extensive, multi-step process to install a constellation file. Further, the system and application allow for two or more constellation files or transponder arrangements to be locally stored or saved. This may provide a user with numerous constellation options with the ability to automatically upload the constellation. In addition, the system and application eliminates the need for a user to manually install a constellation file.

Aspects of the automatically addressable configuration application 200 described herein can be implemented on software running on a computer system. The system herein, therefore, may be operated by computer-executable instructions, such as program modules, executable on a computer. Program modules may include routines, programs, objects, components, data structures and the like which perform particular tasks or implement particular instructions. The software program may be operable for supporting the transfer of information within a network of trusted partner sites using artifacts.

The computers for use with the system and various components described herein may be programmable computers which may be special purpose computers or general purpose computers that execute the system according to the relevant instructions. The computer system can be an embedded system, a personal computer, notebook computer, server computer, mainframe, networked computer, handheld computer, personal digital assistant, workstation, and the like. Other computer system configurations may also be acceptable, including, cell phones, mobile devices, multiprocessor systems, microprocessor-based or programmable electronics, network PC's, minicomputers, and the like. Preferably, the computing system chosen includes a processor suitable in size to efficiently operate one or more of the various systems or functions.

The system or portions thereof may also be linked to a distributed computing environment, where tasks are performed by remote processing devices that are linked through a communications network. To this end, the system may be configured or linked to multiple computers in a network, including, but not limited to a local area network, a wide area network, a wireless network, and the Internet. Therefore, information and data may be transferred within the network or system by wireless means, by hardwire connection or combinations thereof.

The computer can also include a display, provision for data input and output, etc. Furthermore, the computer or computers may be operatively or functionally connected to one or more mass storage devices, such as, but not limited to a database. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system. Examples of computer readable medium include read-only memory, random-access memory, CD-ROM, CD-R, CD-RW, magnetic tapes, and other optical data storage devices. The computer readable medium can also be distributed over a network coupled computer system so that the computer readable code is stored and executed in a distributed fashion.

Although various representative examples of embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

Although the present invention has been described with reference to particular embodiments, persons skilled in the art will recognize that changes may be made in form and detail without departing from the spirit and scope of the invention.

What is claimed is:

1. A system for automatically uploading a constellation module for a motion tracking system comprising:
    a programmable computer system having a first electronically readable storage medium;
    a motion tracking system in communication with the programmable computer system, the motion tracking system including a controller having a second electronically readable storage medium and a plurality of transponders; and
    a configuration module residing on the first electronically readable medium, the configuration module adapted to communicate with the motion tracking system and including a first configuration parameter adapted to automatically instruct the second electronically readable storage medium to delete an existing constellation module, a second configuration parameter adapted to automatically acquire a desired replacement constellation module, and a third configuration parameter adapted to automatically transfer the replacement constellation module to the second electronically readable storage medium.

2. The system of claim 1, wherein the configuration module is Java based.

3. The system of claim 1, wherein the configuration module is adapted to receive instructions from a user interface to transfer the desired replacement constellation module.

4. The system of claim 3, wherein the replacement constellation module is selected from a plurality of constellation modules.

5. The system of claim 4, wherein the plurality of constellation modules are stored on the first electronically readable storage medium.

6. The system of claim 1, wherein the motion tracking system includes a sensor for receiving an ultrasonic pulse transmitted from the plurality of transponders.

7. The system of claim 6, wherein the sensor includes an ultrasonic microphone for receiving the ultrasonic pulse transmitted from the transponders.

8. The system of claim 7, wherein the plurality of transponders are adapted to transmit a plurality of ultrasonic pulses.

9. An automatically addressable configuration system for selectively uploading a constellation module for a motion tracking system comprising:
    a user interface including a plurality of controls;
    a system controller in communication with the user interface and adapted to receive commands from the user interface;
    a programmable computer system in communication with the system controller, the programmable computer system having a first electronically readable storage medium;
    a configuration module residing on the first electronically readable storage medium and adapted to communicate with the system controller;
    a motion tracking system in communication with the programmable computer system and configuration application, the motion tracking system including a controller having a second electronically readable medium and a plurality of transponders, wherein the configuration application is adapted to receive a command from the system controller and accordingly communicate with the motion tracking system to automatically delete an existing constellation module on the second electronically readable medium and automatically transfer a replacement constellation module associated with the system controller communication to be stored on the second electronically readable medium.

10. The system of claim 9, wherein the first system controller adapted to control a multi-display visualization system.

11. The system of claim 9, wherein the constellation module defines an arrangement of transponders.

12. The system of claim 9, wherein the user interface, system controller and programmable computer system are in communication with a router.

13. The system of claim 9, wherein the programmable computer system is further in communication with the user interface.

14. A method for selectively uploading a constellation module for a motion tracking system comprising:

executing automatically a first predefined configuration parameter in a dynamic code set instructing a motion tracking system controller to delete a first constellation module residing on an electronically readable storage medium associated with the motion tracking system controller;

executing automatically a second predefined configuration parameter in a dynamic code set acquiring a second constellation module; and executing automatically a third predefined configuration parameter in a dynamic code set uploading the second constellation module to the electronically readable storage medium.

15. The method of claim 14, wherein the first executing step further comprises receiving a command from an associated controller.

16. The method of claim 15, wherein the second executing step further comprises selecting the second constellation module associated with the received command.

* * * * *